May 23, 1933.  E. D. TILLYER  1,910,483
LENS
Filed May 15, 1928

Inventor
Edgar D. Tillyer.
By Harry H. Styll
Attorney

Patented May 23, 1933

1,910,483

UNITED STATES PATENT OFFICE

EDGAR D. TILLYER, OF SOUTHBRIDGE, MASSACHUSETTS, ASSIGNOR TO AMERICAN OPTICAL CORPORATION, OF SOUTHBRIDGE, MASSACHUSETTS, A VOLUNTARY ASSOCIATION OF MASSACHUSETTS

LENS

Application filed May 15, 1928. Serial No. 278,013.

This invention relates to improvements in multifocal lenses and has particular reference to an improved multifocal lens of one piece of glass.

The principal object of the invention is to provide an improved multifocal lens which will provide a reading field of a limited dimension and a third field either equal to the distance field or different in power from the other two fields.

Another object of the invention is to provide an improved multifocal lens, the reading field of which incorporates another field of different focal length.

Another object of the invention is to provide an improved multifocal lens having a third field incorporated within the reading field, said third field being of the same power as the distance field, whereby objects located at about the distance of the feet from the eye may be clearly seen.

Another object of the invention is to provide an improved multifocal lens, the reading field of which incorporates a third field adjusted to some desirable focus other than that of the reading field.

Another object of the invention is to provide a more inexpensive method of producing multifocal lenses having a reading field in which is incorporated a third field of different focus therefrom.

Other objects and advantages of the invention will become apparent from the following description taken in connection with the accompanying drawing and it will be apparent that many changes may be made in the details of construction, arrangement of parts and steps of the process without departing from the spirit of the invention as expressed in the accompanying claims. I, therefore, do not wish to be limited to the exact details and arrangements shown and described as the preferred forms only have been shown by way of illustration.

In the development of multifocal lenses, particularly in the development of useful bifocal lenses, there is a growing tendency to diminish the size of the reading field and make that field as small in dimension as is compatible with good vision for the range of the eye. The displacement or jump in a multifocal lens in going from one field to the other field is in proportion to the size of the reading field, the smaller the field, the smaller the displacement or jump encountered. One of the difficulties of multifocal lenses has always been the adjustment of the patient's vision in the use of bifocals or multifocal lenses when the patient is walking and particularly when he is going over obstacles such as the curbs of pavements and the steps of stairways. This trouble has been caused by the fact that the reading field is of short focus and objects seen from a distance of the eyes to the feet are blurred and this defect has caused serious accidents in many instances.

It is, therefore, one of the principal objects of my invention to provide an economical process of making a lens having the characteristics of a small reading field incorporating means by which the distance to the feet from the eyes may be clearly and easily seen and to produce a new and useful product by means of this process.

Referring to the drawing.

Figure 2:
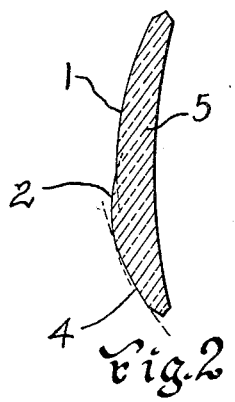
Fig. 2 is a cross section on line 2—2 of Fig. 1 showing a multifocal lens the multifocal curves of which are on the convex surface of the blank.

Referring to the drawing wherein similar reference characters denote corresponding parts throughout, I produce the multifocal lens shown in cross section in Fig. 2 as follows: I mold a glass blank approximately to the meniscus or saucer shape of the lens which is to be produced with the multifocal fields thereon as shown in cross section in Fig. 2, and on one surface thereof I surface and finish the distance curvature 1 and the reading curvature 2. Thus far I have followed the well known procedure of making the so-called one-piece multifocal lenses in which the two curvatures 1 and 2 are ground and finished on one side of a single piece of glass, the curvatures 1 and 2 merging with each other along the line of their division 3. This is accomplished preferably by the use of ring tool grinding, well known in the prior art. After having produced the curvatures 1 and 2 on the blank, I next surface off from the curvature 2 the curvature 4, which is preferably of the same radius as the curvature 1. This then produces the field 4 which is circular in shape and one portion of which is tangent at its lowest portion with the line of division 3 of the curvature 2. On the opposite side I then surface and polish the prescription curve 5 to produce the required power of the lens. It will thus be seen that the vision through the portion 1 of the lens will be distance vision; that the vision through the portion 2 will be the reading vision; and that vision through the portion 4 will also be the distance vision. The curvature 4 is of the same vision as the distance portion for the reason that the curvature 4 is of the same radius as the curvature 1.

Figure 1:
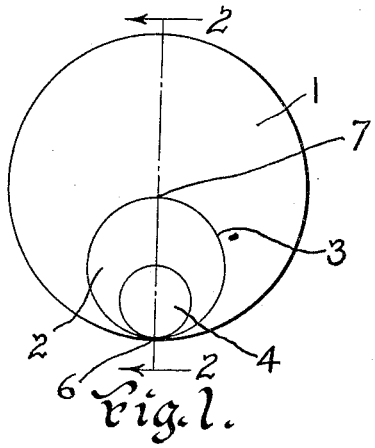
Fig. 1 is a front or plan view of a multifocal lens blank embodying the invention.

It is apparent that I do not need to locate the curvature 4 tangent with the division line 3 at the bottom thereof as shown in Fig. 1, as I may shift it anywhere along the center line from the point 6 to the point 7. It is also apparent that the vision through the portion 4 may be made the same as the distance vision through the portion 1 or may be some other power, such as an intermediate distance, simply by regulating the radius of the curvature 4.

Figure 3:
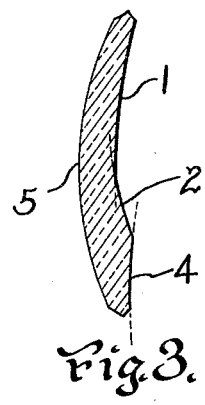
Fig. 3 is a cross section on line 2—2 of Fig. 1 showing the multifocal surfaces of which are on the concave side thereof.

In Fig. 3, I have shown a multifocal lens which is the same kind of lens as that of Fig. 2 having the distance curvature 1, the reading curvature 2, and the distance curvature 4 again below the reading curvature 2, but the multifocal curvatures are placed on the concave side and the prescription curvature 5 is placed on the convex side thereof. These curves are produced in a manner similar to that of producing the curves of Fig. 2 and the sections 2 and 4 may be located in the various positions as referred to in connection with Fig. 2.

Figure 4:
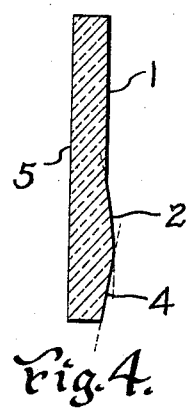
Fig. 4 is a cross section on line 2—2 of Fig. 1 showing a plano or flat blank having the multifocal curves on one side thereof.
Figure 5:
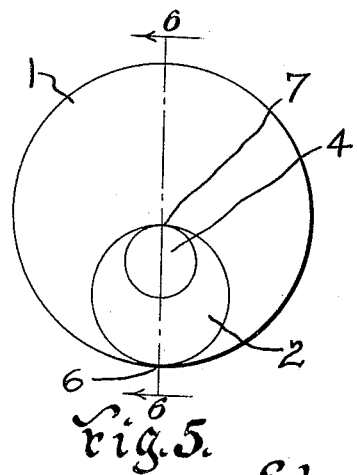
Fig. 5 is a front or plan view of a multifocal lens incorporating the invention and showing a different arrangement of the fields.

Fig. 4 shows a plano type of lens in which the curvature 1 is a flat surface or plano on which is located the reading curvature 2 and the plano field 4. The prescription side 5 is also plano. The field 4 may be located as in Figs. 2 and 3 and the lens is produced by a similar process.

Figure 6:
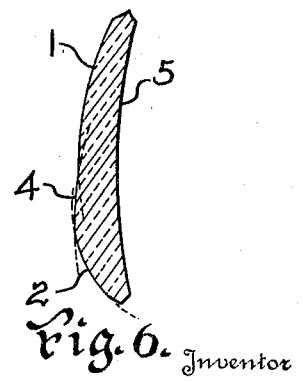
Fig. 6 is a cross section on line 6—6 of Fig. 5.

In Fig. 6 I have shown a multifocal lens in which the field 4 is located tangent at the point 7 instead of at the point 6, as in Fig. 1. This lens is shown in cross section in Fig. 6, the bifocal curves being shown on the convex side of the blank, and is produced in a manner similar to the other forms.

It will be seen that I have produced a multifocal lens having a large comfortable distance field, a small reading field having small jump or displacement when the vision passes from the distance field thereto and have incorporated therewith a third field which may if desired be made of the same power as the distance field for use in walking, or may be made in intermediate power or other foci as desired for various purposes, and that this field 4 may be located at desired positions between the point 6 to the point 7 and the curvatures may be placed either on the convex or concave side, and that the lenses may be of the curved or meniscus form or of the flat or plano form.

Having described my invention, I claim:

1. A multifocal lens comprising on one side of a single piece of glass a major field having an optical surface thereover, a secondary field of greater power than the major field within the confines of the major field, said secondary field having an optical surface thereover, and being circular in outline and said field blending into the major field without difference in level along the line of division of the two fields and a third field within the confines of the secondary field, said third field having an optical surface thereover of a curvature different from that of the major and secondary fields, said third field being depressed into said secondary field and said field blending into the secondary field without difference in level along the line of division of the two fields.

2. A multifocal lens comprising on one side of a single piece of glass a major field having an optical surface thereover, a secondary field within the confines of the major field, said secondary field having an optical surface projecting outwardly beyond the surface of the major field, and said secondary field being circular in outline, said field blending into the major field without difference in level along the line of division of the two fields and a third field within the confines of the secondary field, said third field having an optical surface thereover of a curvature different from that of both the major and secondary fields, said third field being circular in outline and being depressed into said secondary field and said field blending into the secondary field without difference in level along the line of division of the two fields.

3. A multifocal lens comprising on one side of a single piece of glass a major field having an optical surface thereover, a secondary field of greater power than the major field within the confines of the major field, said secondary field having an optical surface projecting outwardly beyond the surface of the major field, and said secondary field being circular in outline, said field blending into the major field without difference in level along the line of division of the two fields, a third field within the confines of the secondary field, said third field having an optical surface thereover of a curvature different from that of both the major and secondary fields, said third field being circular in outline and depressed into said secondary field with its outline tangent to the outline of the secondary field in the vertical meridian of the lens and said field blending into the secondary field without difference in level along the line of division of the two fields.

EDGAR D. TILLYER.